Dec. 7, 1965 R. K. WALKER 3,222,074
DICTATING MACHINE
Filed Jan. 22, 1963 5 Sheets-Sheet 1

INVENTOR.
RICHARD K. WALKER
BY
George H. Fritzinger
AGENT

Dec. 7, 1965   R. K. WALKER   3,222,074
DICTATING MACHINE
Filed Jan. 22, 1963   5 Sheets-Sheet 2
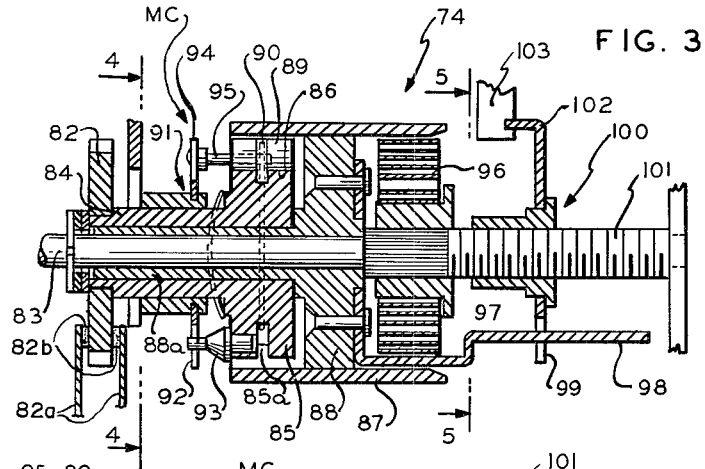
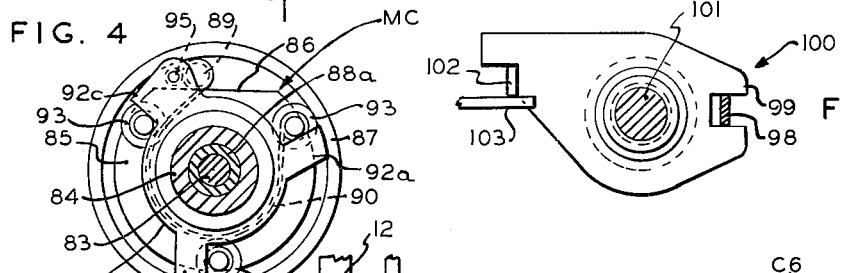
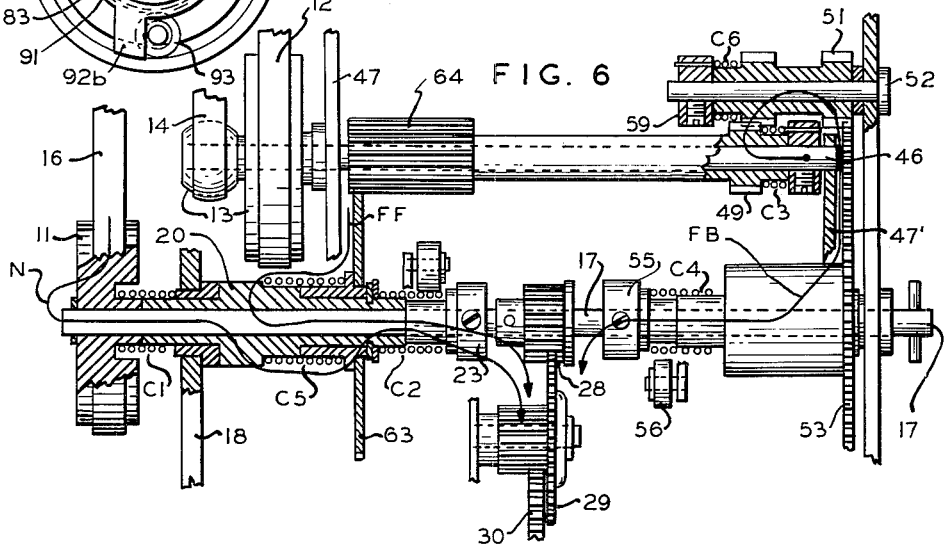
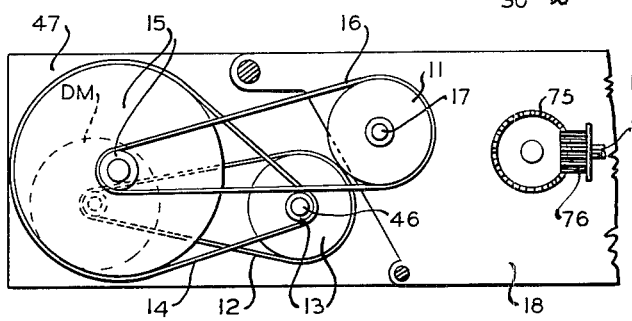
INVENTOR.
RICHARD K. WALKER
BY
George H. Fritzinger
AGENT INVENTOR.
RICHARD K. WALKER
BY George H. Fritzinger
AGENT INVENTOR.
RICHARD K. WALKER
BY
George H. Fritzinger
AGENT

FIG. 14

| CONDITION | CLUTCH C1 | CLUTCH C2 | CLUTCH C3 | CLUTCH C4 | CLUTCH C5 | CLUTCH C6 | DRIVE MOTOR | SCAN MOTOR | BACKSPACE SOLENOID |
|---|---|---|---|---|---|---|---|---|---|
| NORMAL FORWARD IN-TRACK | ENGAGED | ENGAGED | DIS-ENGAGED | DIS-ENGAGED | ENGAGED | ENGAGED | FORWARD | OFF | OFF |
| BACK SCAN CROSSTRACK |  |  |  |  |  |  |  | REVERSE | OFF |
| FORWARD SCAN CROSSTRACK |  |  |  |  |  |  | OFF | FORWARD | OFF |
| FAST BACK IN-TRACK | DIS-ENGAGED | DIS-ENGAGED | ENGAGED | ENGAGED | ENGAGED | DIS-ENGAGED | REVERSE | OFF | ON |
| FAST FORWARD IN-TRACK | DIS-ENGAGED | ENGAGED | ENGAGED | ENGAGED | ENGAGED | DIS-ENGAGED | REVERSE | OFF | OFF |

FIG. 15

| CONDITION | R-R RELAY | DRIVE MOTOR D.M. | SCAN SOLENOID 73 | REVERSE RELAY 112 | EAC SWITCH 104b | AC SWITCH 104a | BACKSPACE SOLENOID ON / EDIT SOLENOID ON |
|---|---|---|---|---|---|---|---|
| RECORD IN-TRACK | RECORD | FORWARD SLOW | OFF | OFF | OPEN | CLOSED |  |
| BACK SCAN CROSSTRACK | PLAYBACK | OFF | ON | ON | CLOSED | OPEN |  |
| PLAYBACK IN-TRACK | PLAYBACK | FORWARD SLOW | OFF | OFF | CLOSED | OPEN |  |
| FORWARD SCAN CROSSTRACK | PLAYBACK | OFF | ON | OFF | CLOSED | OPEN |  |
| FAST FORWARD IN-TRACK | PLAYBACK | REVERSED FAST FORWORD | OFF | ON | OPEN | OPEN |  |
| RETURN TO PRIOR POSITION OF ADVANCE | SWITCH TO RECORD | FORWARD SLOW | OFF | OFF | OPEN | CLOSED | TRANSCRIBE SWITCH DISABLES |
| FAST BACKSPACE IN-TRACK | PLAYBACK | REVERSED FAST BACK | OFF | ON | OPENS | CLOSES | BACKSPACE SOLENOID ON |
| EDIT | SWITCH TO RECORD | OFF | OFF | OFF | OPENS | CLOSES | EDIT SOLENOID ON |

INVENTOR.
RICHARD K. WALKER
BY George H. Fritzinger
AGENT

United States Patent Office 3,222,074
Patented Dec. 7, 1965

3,222,074
DICTATING MACHINE
Richard K. Walker, Convent, N.J., assignor to McGraw-Edison Company, Elgin, Ill., a corporation of Delaware
Filed Jan. 22, 1963, Ser. No. 253,133
12 Claims. (Cl. 274—11)

This invention relates to phonographic machines which are adapted for recording and reproducing dictation. More particularly, the invention relates to improved control and operating mechanisms for dictating machines to enable a dictator to listen back to selected portions of his recorded dictation and to resume his further recordation of dictation in the fastest possible way and with the exercise of a minimum thought and attention to the control of the machine.

The invention has been especially embodied and is herein described in a machine using a record medium in the form of a wide flexible belt having a magnetic coating on one side for recording thereon and reproducing therefrom with the use of a magnetic record-reproduce head. It is to be understood however that no unnecessary limitation of the invention to a machine with a magnetic belt record is intended since many features of the invention have no limitation as to the form of the record medium employed.

In the normal forward drive of the machine the belt record is revolved at a normal speed in a forward direction and the carriage for the record-reproduce head is advanced at a proportionate speed of travel to cause the magnetic head to define a helical track on the belt record. This operation of the drive system is herein referred to as "normal forward in-track drive." If the drive system is merely reversed both as to the belt record and the head carriage then the head traverses the track in a reverse direction by what is herein referred to as a "backspace" movement. If the speed of each of these types of in-track drive movements is increased there is obtained "fast forward in-track drive" and "fast backspace" respectively. In addition to the foregoing, the head carriage may be driven while the belt record is at standstill in either reverse or forward directions typically at an accelerated speed to move the head cross-track in what is herein referred to as "backscan" and "forward scan."

In carrying out an operation of listening back to a selected portion of one's prior recording and returning the head to its prior position of farthest advance to resume the recording operation, each of the different types of drive movements above-mentioned except "backspace" are employed in accordance with the present invention.

It is a general object of the invention to provide an improved drive and control mechanism for dictating machines by which after listening back to a portion of one's recording the head can be restored more quickly and more accurately to its prior position of farthest advance than has been heretofore possible.

It is another object of my invention to provide an improved drive system for dictating machines which can be selectively operated by remote control to perform the aforestated different drive movements.

It is another object of the invention to provide improved drive systems of a simple and compact design capable of carrying out the aforestated different drive movements in a novel manner.

Another object of the invention is to provide an improved advance marker mechanism for marking the point of farthest advance of the head carriage during each operation of listening back to one's prior recording.

Another object is to provide an improved advance marker system having a high resolving power and provided with a dual control effective to shift the drive system first from forward scan to fast forward in-track movement as the head approaches its prior position of farthest advance and then to drop out the fast forward in-track movement at approximately the instant the head passes its prior position of farthest advance.

Another object is to provide an advance marker with a friction drag adapted to rule out errors from backlash arising from any play in the drive mechanism of the marker.

Another object is to provide an improved centralizing means for stopping both forward scan and backscan movements of the head carriage in an in-track position on the record medium.

Another object is to provide such centralizing means with both forward and reverse latching pawls adapted to stop the head carriage in track without backlash.

Another object is to provide new and improved safety features to prevent any attempted misoperation of the machine arising from a lack of a record medium in the machine or from a record medium being not in a fully mounted position.

Another object is to provide a means for signalling the dictator as to certain intermediate conditions of the machine when after listening back to a portion of one's recording the head is returned to its prior position of farthest advance.

These and other objects and features of the invention will be apparent from the following description and the appended claims.

In the description of the invention reference is had to the accompanying drawings, of which:

FIGURE 3 is an axial sectional view taken through the advance marker mechanism;

FIGURE 4 is a fractional sectional view of the marker mechanism taken on the line 4—4 of FIGURE 3;

FIGURE 5 is another fractional sectional view of the marker mechanism taken on the line 5—5 of FIGURE 3;

FIGURE 6 is a top plan view of the portion of the drive mechanism which produces the aforesaid in-track movements, showing by different arrows the respective drive paths of the mechanism for obtaining these different movements;

FIGURE 7 is a left hand elevational view of the drive mechanism;

FIGURE 14 is a chart with reference to the drive mechanism showing the respective conditions of the drive clutches, the backspace solenoid and the drive and scan motors for the five different in-track and scan movements of the drive systems; and FIGURE 15 is a chart with reference to the control circuits of the machine showing the respective conditions of the control elements for the different conditions of operation of the machine.

Figures 1, 2:
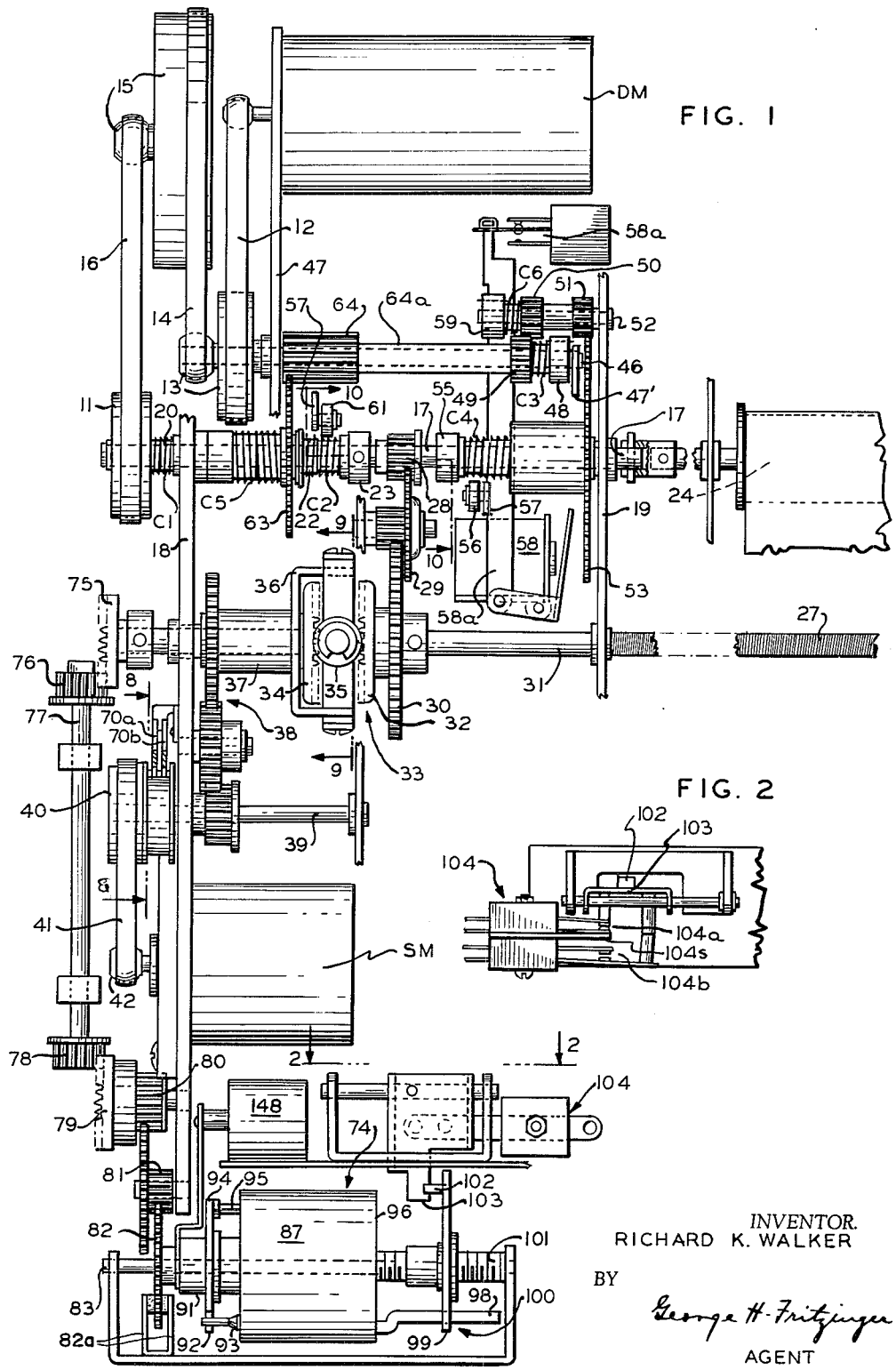
FIGURE 1 is a top plan view to enlarged scale of a drive and advance-marker mechanism for a dictating machine in accordance with the present invention.
FIGURE 2 is a fractional view of the marker mechanism taken on the line 2—2 of FIGURE 1.

The three different in-track movements are produced by a drive motor DM, and the scan or cross-track movements are produced by a scan motor SM. Normal forward in-track drive is produced by the motor DM through a step-down belt transmission to a pulley 11 as shown in FIGURES 1 and 7. From the pulley 11 the transmission continues through the clutches C1 and C2, shaft 17 and mandrel 24 to drive the belt record R, and it continues from the shaft 17 through a gear train 28–30, differential gear mechanism 33, and shaft 31 to drive a feed screw 27 for the head carriage. This coupling path is partially indicated by the circuitous arrow N shown in FIGURE 6. Both fast backward in-track and fast forward in-track movements are produced by the drive motor DM running in a reverse direction. The coupling to the mandrel 24 for fast backward drive is via an intermediate pulley 13 of the aforementioned belt transmission, a shaft 46, collar 48, clutch C3, gear 49, double gear 50–51, gear train 51–53, clutch C4, collar 55 and shaft 17. This coupling path is partially indicated by the arrow FB in FIGURE 6. The coupling to the mandrel 24 for fast forward drive is from the intermediate pulley 13 through the shaft 46, collar 48, clutch C3, sleeve 64a, gears 64–63, clutch C5, sleeve 20 and clutch C2 to the shaft 17. This coupling path is partially indicated by the arrow FF in FIGURE 6. During both of these fast in-track movements the coupling from the shaft 17 to the feed screw 27 remains the same. In the detailed description of these in-track drive movements which herein next follows, reference should be had also to the chart of FIGURE 14.

NORMAL FORWARD IN-TRACK DRIVE

Figure 10:
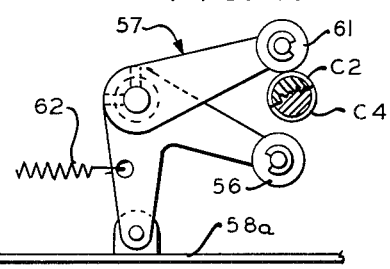
FIGURE 10 is a fractional view as seen from the broken line 10—10 of FIGURE 1 intended to show only the pressure means for alternately engaging the drive clutches C2 and C4.
Figure 12:
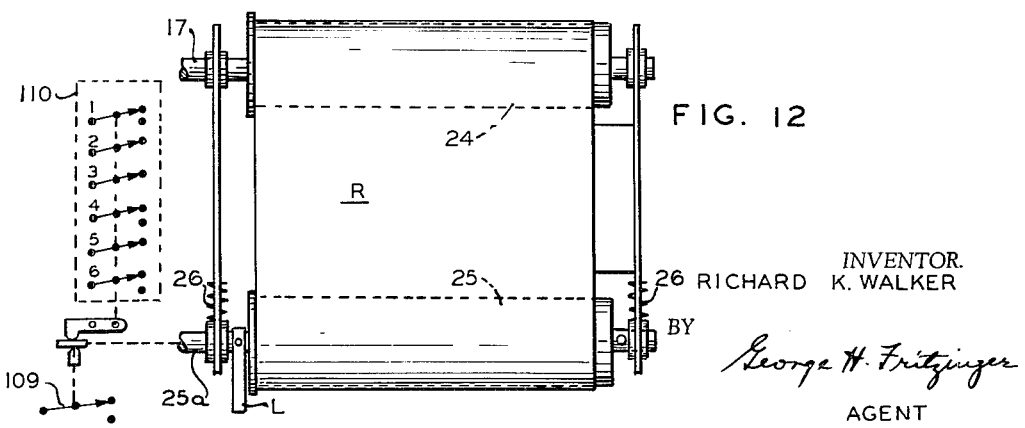
FIG. 12 is a plan view of the belt record and support drums showing diagrammatically the load and belt record safety switches.

During this normal drive operation, the drive motor DM rotates the drive pulley 11 in a forward direction (clockwise as viewed from the left end of the motor in FIGURE 7) at a speed of 30 r.p.m. through a speed-reduction non-reversing coupling which proceeding from the motor comprises a belt 12, step pulley 13, belt 14, step pulley 15 and belt 16. The pulley 11 is free to journal on the shaft 17, and the shaft 17 is in turn journaled in bearings in side frame members 18 and 19. Traversing the bearing of the shaft 17 in the frame 18 is a sleeve 20 coupled during forward drive of the motor DM by the one-way spring clutch C1 to the pulley 11. The other end of the sleeve 20 is now coupled by the one-way spring clutch C2 to a collar 23 pinned to the shaft 17. The one-way spring clutch C2 is of the type held normally engaged by a pressure roller 61 journaled on a rocker 57 itself spring biased by a tension spring 62 as shown in FIGURE 10. Thus, the shaft 17 is driven in a forward direction in unison with the pulley 11. At its far end the shaft 17 is directly coupled to the mandrel 24. The belt record R is trained around this mandrel and a second mandrel 25 as shown in FIGURE 12. Three precise revolutions of the drive mandrel 24 are required to provide one complete revolution of the belt record. Thus the belt record is driven in a forward direction at a speed of 10 r.p.m.

Figure 9:
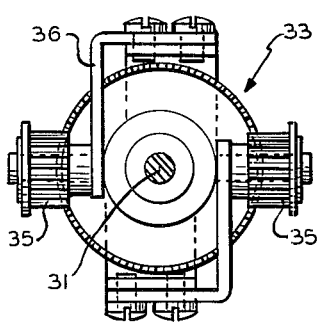
FIGURE 9 is a sectional view to enlarged scale of the differential gear of the scan drive mechanism taken on the line 9—9 of FIGURE 1.

During recording and reproducing the drive motor also rotates the feed screw 27 at a speed of 2 r.p.m. to provide five track convolutions on the belt record for each revolution of the feed screw. The drive coupling to the feed screw is taken from a pinion gear 28 pinned to the shaft 17. This pinion gear is coupled through a step gear 29 to a spur gear 30 journaled on the shaft 31. The spur gear 30 has a crown gear 32 connected thereto, which forms part of a planetary gear mechanism 33 (FIGURES 1 and 9). The planetary gear mechanism comprises a second crown gear 34 secured to the shaft 31. Intercoupling the two crown gears are two planetary gears 35 journaled on a yoke 36, which is secured to a sleeve 37 rotatable on the shaft 31. The sleeve 37 is coupled by a gear train 38 (FIGURE 1) to a shaft 39 journaled also in the frame 18. The shaft 39 is in turn coupled by a pulley 40 and belt 41 to the drive pulley 42 of the scan motor SM. During recording the scan motor is at standstill to hold the yoke 36 stationary. The step-down gearing 28–30 has a ratio of 15 to 1 to drive the gear 30 at 2 r.p.m. Since the planetary gear mechanism is now constrained against planetary movement, the two crown gears 32 and 34 are driven at the same speed but in opposite directions to cause the feed screw 27 to be driven also at 2 r.p.m. but in a direction reversed from that of the gear 30.

Figure 11:
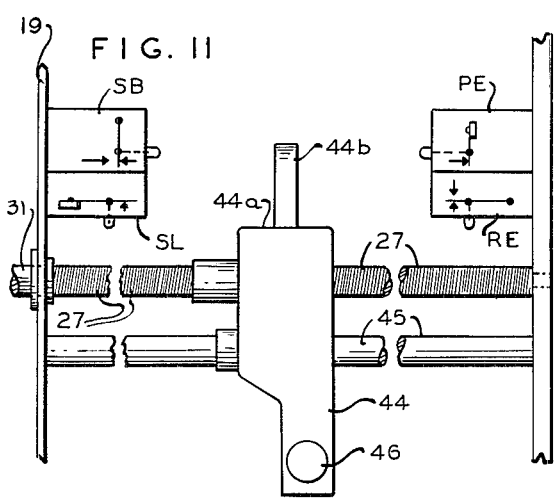
FIGURE 11 is a plan view of the head carriage showing the carriage end switches.

A head carriage 44 is mounted slidably on a cross rod 45 for movement along the mandrels 24 and 25. The carriage has a feed nut (not shown) in mesh with the feed screw 27. As the belt record is driven in a forward direction, the carriage is advanced proportionately from left to right as it appears in FIGURE 11. Mounted on the carriage is a record-reproduce head 46 typically of a magnetic type, having pole pieces engaging a magnetic coating on one side of the belt record R to define a helical track thereon. The pitch of the threads of the feed screw are typically .100″ to give a track pitch on the belt record of .020″.

FAST BACKWARD IN-TRACK DRIVE
(BACKSPACE)

The belt record and feed screw can be driven at an accelerated rate to drive the head carriage 44 backward at a fast speed with the head moving "in-track." During this backspacing the drive motor is reversed. Because of the reverse movement of the drive motor the one-way clutch C1 is disengaged to remove the drive connection from the pulley 11 to the sleeve 20. However, the shaft 46 journaled in the side standards 47 and 47′ and to which the intermediate step pulley 13 is pinned has the collar 48 secured to it outer end portion coupled to the adjacent pinion gear 49 on the same shaft by the one-way spring clutch C3 now held engaged because of the reverse drive of the motor DM. The pinion gear 49 meshes with one section of the intermediate double gear 50–51 journaled on a stud 52 carried by the standard 19. The other section of the double gear 50–51 meshes with a gear 53 journaled on the shaft 17 to turn this gear in a reverse direction relative to the forward direction of the shaft 17. The gear 53 has a hub extension adjacent to the collar 55 pinned to the shaft 17. Between the hub extension and collar 55 there is the one-way spring clutch C4. When a backspacing solenoid 58 is energized it moves forwardly a link 58a (FIGURE 1) to turn the rocker 57 against the force of the tension spring 62 in a counterclockwise direction (FIGURE 10) firstly to withdraw the pressure roller 61 from the clutch C2 and secondly to press a roller 56 on a second arm of the rocker 57 against the spring clutch C4 to couple the gear 53 to the shaft 17. The belt record R is therefore now driven in a reverse direction. The coupling from the shaft 17 via the gears 28–30 and the differential gear mechanism 33 to the feed screw 27 is retained to cause the head carriage 44 to be also driven in a backward direction in accordance with the fast backward rotation of the belt record. Thus, the record-reproduce head 46 now defines a backward in-track movement at a fast speed.

Secured to an end portion of the stud 52 is a collar 59. Between this collar and the gear 50 there is a one-way spring clutch C6. During the fast backward movement just described the gear 50 is turned in a direction causing the spring clutch C6 to be disengaged. However, during normal forward advance of the drive system hereinbefore described the spring clutch C6 acts as a one-way brake to secure the intermediate gear 50 to the stationary collar 59 and to prevent then any possible rotation of the gear 53.

FAST FORWARD IN-TRACK DRIVE

During fast forward in-track drive of the record medium and head carriage, the drive motor DM is again operated in a reverse direction causing the clutch C1 to be again disengaged and the clutch C3 to be engaged; however, the backspace solenoid 58 is now dropped out to engage the clutch C2, to couple the sleeve 20 to the shaft 17, and to disengage the clutch C4. Although the gear 49 again drives the gear 50–51 which in turn drives the gear 53, this is without effect because the clutch C4 is disengaged. Journaled on the sleeve 20 is a gear 63 which is in direct mesh with a pinion gear 64 connected by a sleeve 64a to the gear 49. There being no intermediate gear between the gear 64 on the shaft 46 and the gear 63 on the shaft 17, as there is between the gear 49 on the shaft 46 and the gear 53 on the shaft 17, the gear 63 is driven in a direction reverse to that of the gear 53. Between the gear 63 and the sleeve 20 is a one-way spring clutch C5 which is engaged when the gear 63 is driven clockwise. Since the clutch C2 is now engaged, as just explained, the shaft 17 is now driven in a forward direction at an increased speed direct from the shaft 46 via the clutch C3, gear 64, gear 63, clutch C5, sleeve 20, clutch C2 and collar 23. Again there is maintained the same coupling between the shaft 17 and the feed screw 27 to cause the head carriage to be advanced at a fast speed in proportion to the increased speed of the belt record with the head again moving in-track.

BACK AND FORWARD SCAN

In describing the back scan and forward scan movements of the drive system reference should again be had to the chart of FIGURE 14. These scan movements are produced by driving the head carriage at an accelerated speed while the drive motor DM and the belt record are at standstill causing thus the magnetic head 46 to be moved cross-track. When the scan motor is driven in a forward direction—a direction counterclockwise as viewed from the pulley 42—it drives the pulley 40 via the belt 41 in the same direction, which in turn drives the sleeve 37 likewise in a counterclockwise direction through the gear train 38. Since the drive motor DM is now at standstill, the crown gear 32 is held stationary. Rotation of the sleeve 37 planetates the gears 35 to drive the feed screw in the same direction. Thus, the feed screw is driven in a direction to advance the head carriage. The speed ratio from the pulley 40 to the sleeve 37 is 2½:1 step-down and from the sleeve 37 through the differential gear mechanism 33 to the feed screw 27 is 2:1 step-down giving a total step-down ratio of 5:1 from the pulley 40 to the feed screw. A ⅕ turn of the feed screw advances the head carriage by exactly one track pitch distance. It follows therefore that each turn of the pulley 40 produces a movement of the head 46 from one track to the next. This is important in stopping the head in-track, or in centralizing the head as it is otherwise herein described, after each scan movement, as will appear.

The coupling from the scan motor SM to the pulley 40 is about 3:1 step-down giving a total step-down from the scan motor to the feed screw 27 of about 15:1. The scan motor turns at 3000 r.p.m. to drive the feed screw during scanning at about 200 r.p.m. Since each revolution of the feed screw produces .100″ advance of the head carriage, the latter is driven during cross-track scanning at a speed of about ⅓″ per second.

TRACK CENTRALIZING AT END OF SCAN

Figure 8:
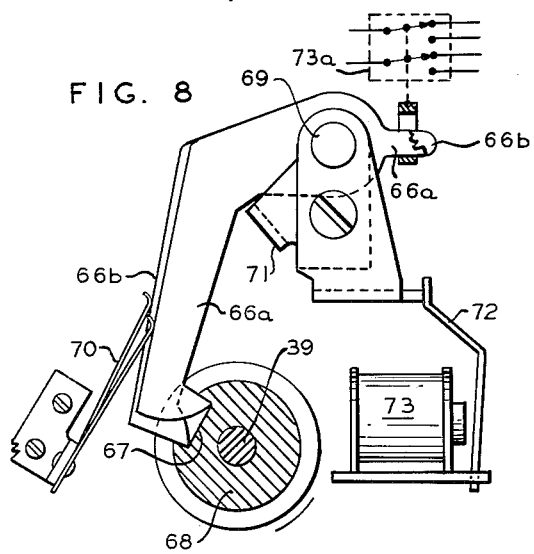
FIGURE 8 is a sectional view to enlarged scale of the track centralizing means taken on the line 8—8 of FIGURE 1.

During normal forward drive of the belt record and feed screw, as well as during both fast-forward and fast-backward (backspace), the scan motor is not only at standstill but the scan drive pulley 40 is held in a precise position of rotation defined by the engagement of two latch pawls 66a and 66b with a notch 67 in a collar 68 pinned to the shaft 39 as shown in FIGURE 8. The latch pawls 66a and 66b are pivoted to the frame plate 18 at 69, and are urged individually by respective springs 70 against the collar 68. A bail 71 pivoted also at 69 is coupled to the armature 72 of a scan solenoid 73. When the scan solenoid is activated it pushes the bail 71 against both of the pawls to disengage them from the notch in the collar 68. Coupled to the pawls 66 is a scan switch 73a for controlling the scan motor and for performing other control functions hereinafter described. Upon the de-energization of the scan solenoid, the pawls drop against the periphery of the collar 68 in response to the spring forces exerted thereon but the scan switch is not dropped out to cut off the current supply to the scan motor until both pawls have engaged the notch 67.

The pawls 66a and 66b have teeth which are oppositely directed so that one is effective to latch the collar 68 against clockwise movement and the other to latch the collar 68 against counterclockwise movement. Moreover, the end surfaces of the teeth opposite their latching surfaces are inclined, and the width of each tooth in the direction of rotation of the collar is less than the peripheral length of the notch 67, to allow the latching pawl effectively in the direction of driven movement of the collar 68 to move progressively into engagement with the notch. The instant the latching pawl has stopped the collar, the other pawl drops into the notch to prevent any backlash. The movement of the last of the pawls into the notch permits the scan switch 73a to drop out to break the circuit of the scan motor. Since each scan operation begins with both pawls engaged and the head precisely in-track and stops with both pawls again engaged to define an integral number of revolutions of the scan drive wheel 40, it follows that the head will always stop precisely in-track after each scan operation.

ADVANCE MARKER

A feature of the present control system is in providing an improved advance marker 74 of the character described and claimed in the Whitney Patent 3,021,143, dated February 13, 1962, which is utilized in a novel manner to perform a dual control function. As will appear, the dual control function enables the head to be brought precisely into an in-tract registration with the point of farthest advance on the belt record after the head is backspaced and returned for further recording. This advance marker shown in FIGURES 1, 3 and 4 is driven from the shaft 31 through a crown gear 75 connected to the outer end of the shaft. Meshing with the crown gear 75 is a pinion gear 76 on a cross shaft 77. On the other end of the shaft 77 is a pinion gear 78 meshing with a crown gear 79. Connected to the crown gear 79 is a pinion gear 80 which is coupled through a stepped gear 81 to a spur gear 82 journaled on a stationary shaft 83 forming the shaft of the advance marker. A U-shaped bracket 82b which carries friction pads 82b which bear yieldably against opposite sides of the spur gear 82 (FIGURES 1 and 3) to place a drag on the gear and rule out errors from backlash. The gear 82 is staked to a sleeve 84 on the shaft 83. The sleeve has a collar 85 at its far end forming the body of a one-way marker clutch MC. This clutch collar 85 is provided with a peripheral flat 86. Surrounding the clutch collar is a clutch cylinder 87. This cylinder is press-fitted to a point midway its length onto a hub 88 having a bushing 88a formed integrally therewith and extending through the sleeve 84 on the shaft 83 to give the hub a stable mounting. A clutch roller 89 is mounted loosely in the space formed by the flat 86 between the cylinder 87 and the collar 85. A torsion spring 90 is disposed in a peripheral slot 85a in the clutch collar 85 and has its inner end connected to the collar and its outer end bearing against a centrally grooved portion of the clutch roller. Under influence of this torsion spring the clutch roller is pressed counterclockwise with a wedging action between the collar 85 and the cylinder 87 to engage the marker clutch MC for driving the cylinder in a clockwise direction.

Mounted pivotally and slidably on the sleeve 84 between the cylinder 87 and the gear 82 is a trip member 91 for the marker clutch MC. This trip member has three equally spaced fingers 92a, 92b and 92c positioned clockwise of respective cone-shaped cam studs 93 mounted on the side face of the clutch collar 85. Staked to a portion of the finger 92c (FIGURE 4) is a pin 95 which extends into the clutch cylinder 87 in the end space of the flat 86 just counterclockwise of the clutch roller 89. The trip member floats on the sleeve in the position just described, but when the trip member is pressed inwardly towards the cylinder 87 it is cammed clockwise by the cone-shaped camming studs 93 to disengage the clutch roller 89 from its wedging relationship between the cylinder and the clutch collar 85. When the clutch roller is so disengaged the marker clutch MC is disengaged to cause the cylinder 87 to be propelled counterclockwise by a clock spring 96. This clock spring is disposed in the right end portion of the cylinder 87 and has its outer end connected to the cylinder and its inner end connected to a collar 97 staked to the shaft 83.

Secured to the hub 88 is a coupling arm 98 which extends beyond the right end of the cylinder 87 in parallel relation to the shaft 83. The outer end portion of this arm extends through a slotted radial arm 99 of a measuring member 100 which is threaded onto a screw portion 101 of the stationary shaft 83 (FIGURES 3 and 5). The measuring member 100 has a second arm 102 which forms the measuring arm of the advance marker. This measuring arm is normally held in a home position by the clock spring 96. In this home position the arm bears against an arm 103 of an advance clutch switch 104 to hold the clutch switch in an operated position. In this home position of the measuring member 100 the same is nearest the cylinder 87. The advance clutch switch 104 has a first set of contacts 104a which are held normally closed and a second set of contacts 104b which are held normally open by the measuring arm 102 under influence of the clock spring 96 (FIGURE 2). As the head carriage is backspaced from a position of farthest advance the first contacts 104a are opened immediately and when the carriage has been moved through the distance of about one track pitch the second contacts 104b—sometime hereinafter referred to as the early advance switch—are closed. In order that the contacts 104a will be reclosed, when the carriage is returned from a backspaced position, at the exact prior position of farthest advance which the carriage had before it was backspaced, the stationary one of the two contacts 104a is rigidly backed as by an insulated steel stop plate 104s shown in FIGURE 2.

As will appear from the later description of the control circuitry, upon pressing a record on-off switch 105 while the head 46 is in a backspaced position the drive system is operated in forward scan until the head is moved to about one track pitch distance from its prior position of farthest advance. At this distance from the point of farthest advance the advance clutch switch 104b is opened to convert the drive system to fast forward in-track movement. When during the fast forward in-track movement the head 46 passes its prior in-track position of farthest advance the advance clutch switch 104a is closed to shift the machine from reproducing to recording and to restore the drive system to normal forward in-track operation. The record switch 105 becomes then again a start-stop switch for recording.

SAFETY SWITCHES

There are two safety switches at the start end of travel of the head carriage 44—a start backscan switch SB and a start load switch SL—and two safety switches at the forward end of travel of the head carriage—a record end switch RE and a playback end switch PE. The start load switch SL and playback end switch PE may be of the single-throw leaf type but the switches SB and RE are of the double-throw overcenter type. These switches are biased into the positions which they occupy in FIGURE 11.

When the head carriage 44 is backspaced to within about one track pitch distance from its start position the backsurface 44a of the carriage cams open the push button start load switch SL, and when the head carriage reaches its very start position an arm 44b of the carriage operates the push button backscan switch SB. Further, when the head carriage is advanced to within about one track pitch distance of its forward end of travel the backsurface 44a cams the record-end switch RE into an operated position and when the carriage reaches the very end of its forward travel the carriage arm 44b operates the push button playback end switch PE. The start-load switch SL and the record-end switch RE set the limits on the carriage travel during recording, and the start backscan switch SB and playback end switch PE set the limits on the carriage travel during reproducing.

Also, there is provided a belt record safety switch 109 which occupies the position shown in FIGURE 12 when a belt record R is mounted on the mandrels 24 and 25. This switch may be controlled from the shaft 25a for the mandrel 25. For instance, when a load lever L is released while a belt record R is in place on the mandrels 24 and 25, the mandrel 25 is shifted by the springs 26 to tauten the belt record around the two mandrels. However, if the load lever L is released while there is no belt record R on the mandrels the springs 26 will displace the mandrel 25 beyond the position it occupies in FIGURE 12 and will operate the belt record switch 109.

Further, there is provided a six-pole double-throw load switch 110 which has the position shown in FIGURE 12 when a belt record is mounted for normal operation of the machine. This switch may also be controlled from the shaft 25a as in the manner diagrammatically indicated in FIGURE 12. For instance, when the load lever L is operated to shift the mandrel 25 towards the mandrel 24 to permit a belt record R to be telescoped onto the two mandrels, the load switch L is shifted downwardly into an operated position, but when the load lever L is released to allow the springs 26 to tauten the belt record around the two mandrels the load switch is returned to its unoperated position shown in FIGURE 12.

RR RELAY

The machine includes a record-reproduce relay hereinafter referred to as the RR relay—which has a first bank of four switches 111a and a second bank of two switches 111b as shown in the schematic diagram of FIGURE 13. When the switch poles are inclined upwardly as they appear in FIGURE 13 the RR relay is in record position, and when the switch poles are inclined downwardly the relay is in reproduce position. Upon activating a record coil 111R the RR relay is shifted into record position and then latched by means not herein necessary to show, and upon activating a reproduce coil 111P the RR relay is shifted into a reproduce position and there latched. The bank of switches 111b are utilized for connecting a microphone M through an amplifier A to the record-reproduce head 46 when the RR relay is in record position, and for connecting the head 46 through the amplifier A to a speaker S when the RR relay is in reproduce position.

RECORD

Figure 13:
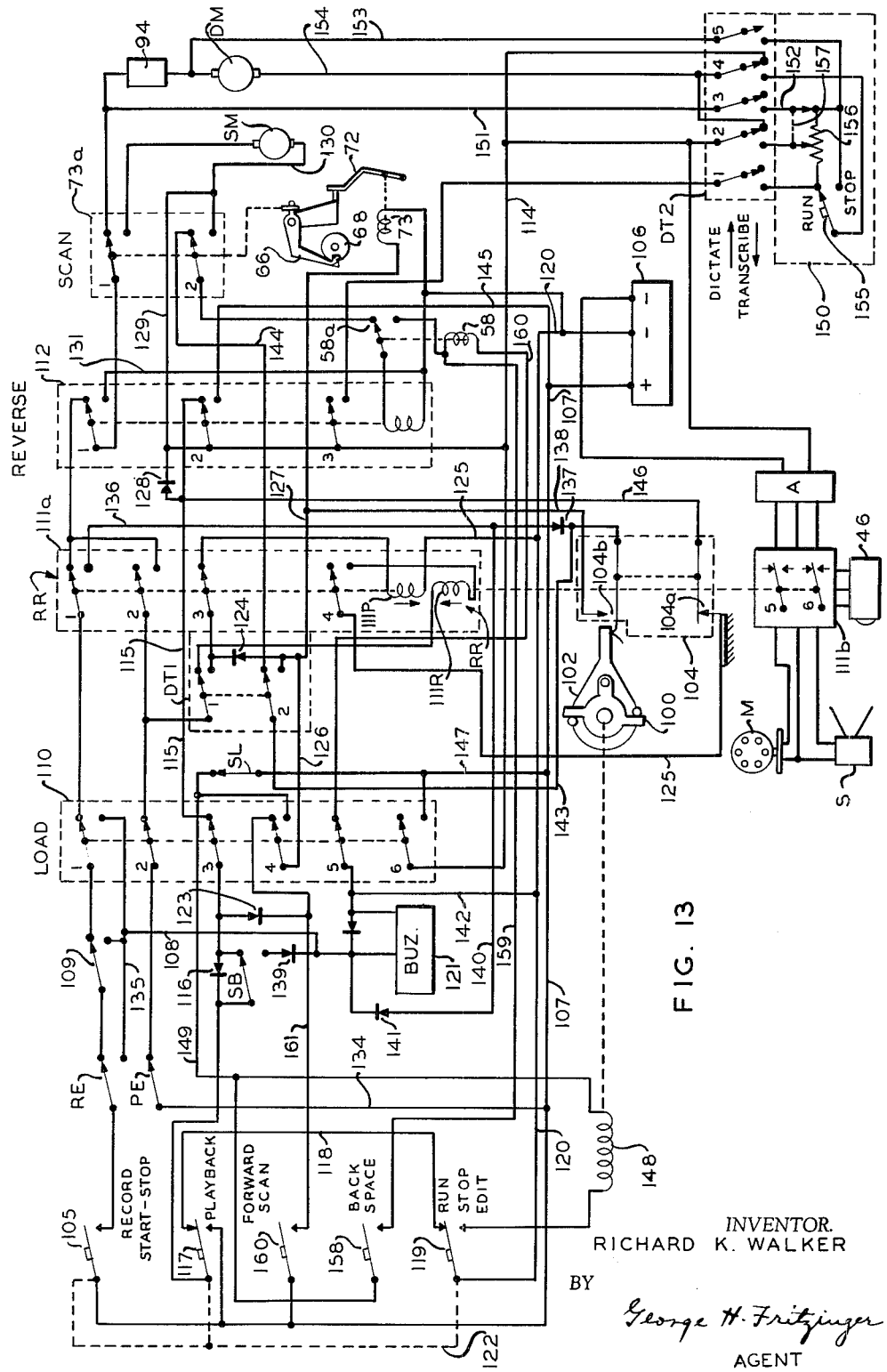
FIGURE 13 is a schematic circuit diagram of the machine.

The following description will be better understood with reference to the schematic diagram of FIGURE 13 and the chart of FIGURE 15. When the operator presses the record start-stop switch 105 to record on the mounted belt record R a circuit is completed through the drive motor DM in a forward-run direction from a plus terminal of a battery 106 through a lead 107, record switch 105, record end switch RE, belt record switch 109, pole 1 upper contact of the load switch 110, pole 1 upper contact of the RR relay, pole 1 upper contact of a reverse relay 112, pole 1 upper contact of the scan switch 73a, the drive motor DM, pole 2 right contact of a dictate-transcribe switch DT2, pole 2 upper contact of the reverse relay 112, lead 115, pole 3 of load switch 110, diode 116, playback switch 117, lead 118, edit switch 119, and lead 120 to the negative terminal of the battery 106. The drive motor DM is then driven in a forward direction to advance the belt record at normal speed from the pulley 11 through the one-way spring clutch C1, sleeve 20, one-way spring clutch C2, shaft 17 and the drive mandrel 24 as before described. At the same time the feed screw 27 is driven at normal speed from the shaft 17 through the gear train 28-30, differential gear mechanism 33 and shaft 31. When the record switch 105 is released the drive system is stopped, and vise versa. However, if there is no belt record on the mandrels 24 and 25 and the load lever is released the belt record safety switch 109 will be open to break the drive circuit and prevent the machine from being operated. The same is true if the load lever L is not released to tension the belt between the mandrels for then pole 1 of the load safety switch 110 will be open at its upper contact. Further, if the head carriage reaches the end of its recording range the record end switch RE will break at its upper contact to stop the drive system. In either of these three events a circuit is completed to give a warning signal when the record switch 105 is pressed, the circuit running from plus terminal of the battery 106 through the record switch 105, the particular one of the safety switches just mentioned, a lead 108, buzzer 121 and leads 142 and 120 to the negative terminal of the battery 106.

PLAYBACK

If at any time during the recording of dictation the operator wishes to listen back to a portion of his recorded dictation, he will release the record switch 105 to stop the drive system and then press the playback switch 117 to close it with its lower contact. This causes the coil 111P of the RR relay to be activated momentarily from the plus terminal of the battery 106 through lead 107, lower contact of playback switch 117, start backscan switch SB at its upper contact, diode 123, pole 4 upper contact of load switch 110, diode 124, pole 3 of the RR relay, coil 111P of the RR relay and leads 125 and 120 to the negative terminal of the battery 106. As soon as the RR relay is so momentarily activated it becomes latched in reproduce position until the record coil 111R is next activated.

As the playback switch 117 is pressed the scan solenoid 73 is also activated through a circuit running from the plus terminal of the battery 106 through lead 107, playback switch 117, start backscan switch SB, diode 123, pole 4 upper contact of load switch 110, leads 126 and 127, scan solenoid 73 and minus terminal of battery 106. At the same time the reverse relay 112 is activated via the same circuit through the switch SB and from there via pole 3 of the load switch, lead 115, diode 128, lead 129, pole 2 lower contact of scan switch 73a, switch 58a upper contact of the backspace solenoid 58, coil of the reverse relay 112 and negative terminal of battery 106. This operation of the reverse relay in turn operates the scan motor SM via the same circuit through the diode 128 and from there via the leads 129 and 130, the scan motor SM, pole 1 lower contact of scan switch 73a, pole 1 lower contact of reverse relay 112, lead 131 and minus terminal of battery 106. The direction of the current flow through the scan motor SM is now upward to cause the same to turn in a direction to drive the head carriage 44 in a backward direction.

During scan operations the drive motor DM is not operated because its circuit is broken at pole 1 of the scan switch 73a. The gear 30 is therefore held at a standstill to cause a rotation of the sleeve 37 to be transmitted through the differential gear mechanism 33 to the shaft 31 for the feed screw. Also, the activation of the scan solenoid 73 disengages the pawls 66 to enable the scan motor to drive the pulley 40 coupled through the gear train 38 to the sleeve 37. The head carriage is therefore driven backwards in cross-track relation to the belt record R at a fast speed.

The advance clutch contacts 104a are opened at the very start of backspacing the head carriage and the second advance clutch contacts 104b are closed when the carriage is backspaced a little more than one track pitch distance. During a continuing backspacing or backscanning movement of the head carriage the advance clutch switches 104a and 104b remain respectively in open and closed positions. However, when the head carriage is returned to about one track pitch distance from its prior position of farthest advance the early advance clutch contacts 104b are opened and when the head carriage reaches its prior position of advance the first advance clutch contacts 104a are closed.

When the operator has backspaced the head carriage to a desired point he releases the playback switch 117 allowing it to close with its upper contact. The RR relay 111 remains latched in reproduce position because the record coil 111R has not yet been activated. Release of the playback switch 117 breaks the circuit of the scan solenoid 73 allowing it to drop out. However, this drop out does not occur until the latch pawls 66 come into engagement with the notch 67 so as to assure that the head carriage is backspaced an integral number of track pitch distances with the head stopping in-track at the end of the backscan movement. In turn, the drop out of the scan switch 73a breaks the circiut of its pole 2 with its lower contact to drop out the reverse relay 112. The drop out of the scan switch 73a also disconnects pole 1 thereof from its lower contact to stop the scan motor SM and it connects this pole to its upper contact to connect the drive motor DM in a circuit running from plus terminal of battery 106 through lead 107, lead 134, playback end switch PE, pole 2 of load switch 110, pole 2 lower contact of the RR relay, pole 1 upper contact of the reverse relay 112, pole 1 upper contact of the scan switch 73a, drive motor DM via its governor switch 94, pole 4 of the dictate-transcribe switch DT2, lead 114, pole 2 upper contact of the reverse relay 112, pole 3 of the load switch 110, diode 116, upper contact of the playback switch 117, lead 118, upper contact of the edit switch 119 and lead 120 to the minus terminal of battery 106. The direction of the current through the drive motor DM is now downward to cause the motor to turn in a forward direction. Since the backspace solenoid 58 stands not operated the clutch C2 remains engaged to cause a motion to be transmitted from the sleeve 20 through the clutch C2 and shaft 17 to the record mandrel 24 and from the shaft 17 through the gear train 28-30, the differential gear mechanism 33 and the shaft 31 to the feed screw 27. Thus when the playback switch is released the drive system is operated normal forward in-track to cause the machine to reproduce the recorded dictation across which the head carriage has just been scanned.

If the operator desires to stop the reproduction of his prior dictation and to advance the head carriage quickly to an intermediate position or even to its prior position of farthest advance he will press the record switch 105 and hold the same down as long as the head carriage is to be advanced. Upon so pressing the record switch 105 while the machine is in playback, the circuit is completed for the scan solenoid 73 from plus terminal of battery 106 through lead 107, record switch 105, safety switches RE and 109, pole 1 upper contact of load switch 110, pole 1 lower contact of the RR relay, lead 136, diode 137, early advance clutch switch 104b now closed because of the advance clutch measuring arm 102 being retracted from its home position, lead 138, the scan solenoid 73 and the negative terminal of battery 106. Activation of the scan solenoid breaks the circuit to the drive motor DM and starts the scan motor SM by a circuit leading from plus terminal of battery 106 through leads 107 and 134, playback and switch PE, pole 2 upper contact of load switch 110, pole 2 lower contact of the RR relay, pole 1 upper contact of the reverse relay 112, pole 1 lower contact of the scan switch 173a, scan motor SM, pole 2 upper contact of the reverse relay 112, lead 115, diode 116, playback switch 117 at its upper contact, edit switch 119 at its upper contact and lead 120 to minus terminal of the battery 106. The head carriage 44 is therefore driven cross-track in a forward direction and at a fast speed. However, at any point during the forward scan the operator may release the record button to stop the fast-forward cross-track advance of the head carriage, and upon such release the scan operation will be stopped with the head being in-track because of the centralizing action of the pawls 66. During the fast forward cross-track scan movement the buzzer 121 is activated by a circuit leading from plus terminal of battery 106 through the record switch 105, pole 1 lower contact of the RR relay, leads 136 and 140, diode 141, the buzzer 121, and leads 142 and 120 to the negative terminal of the battery 106.

If the operator holds the record switch down until the head carriage comes to within a little more than one track pitch distance from its prior position of farthest advance, the early advance clutch switch 104b is opened to drop the scan solenoid 73 and allow the centralizing pawls 66 to drop onto the collar 68 and engage the notch 67 as soon as the notch next comes into registration therewith. The egagement of the centralizing pawls with the notch 67 returns the scan switch 73a to stop the forward cross track scanning at an instant when the head is in track. This is because every scan movement is started from a point where the head 46 is in-track and the scanning is limited always to an integral number of track pitch distances while the belt record R is at standstill.

At the instant the cross track scanning movement is stopped by the early advance clutch switch 104b, the playback switch 117 is standing released, the record switch 105 is standing depressed, the RR relay is still in reproduce position, the reverse relay 112 is dropped out and the scan switch 73a is being returned. The return of the scan switch 73a activates the reverse relay 112 by a circuit from the plus terminal of battery 106 through lead 107, record switch 105, pole 1 lower contact of RR relay, lead 136, diode 137, lead 143, pole 2 upper contact of the dictate transcribe switch DT 1, lead 144, pole 2 upper contact of scan switch 73a, backspace solenoid switch 58a, coil of reverse relay 112 and negative terminal of battery 106. The drop out of the scan solenoid 73 and the activation of the reverse relay 112 converts the drive system from fast forward scan to fast forward in-track but maintains the buzzer circuit as before described.

The return of the scan switch 73a also opens the circuit of the scan motor SM and closes the circuit of the drive motor DM by the shifting of pole 1 of the scan switch from its lower to its upper contact. The reverse relay 112 is activated by return of pole 2 of the scan switch to its upper contact, the circuit for the reverse relay running from the plus terminal of battery 106 through lead 107, record switch 105, record end switches RE, belt switch 109, pole 1 upper contact of the load switch 110, pole 1 lower contact of the RR relay, lead 136, diode 137, lead 143, pole 2 upper contact of the dictate-transcribe switch DT1, lead 144, pole 2 upper contact of the scan switch 73a, switch 58a upper contact of the backspace solenoid 58, coil of the reverse relay 112 and lead 120 to negative terminal of the battery 106. The operation of the reverse relay 112 while the scan switch 73a is returned provides a circuit for the drive motor DM from plus terminal of the battery 106 through lead 145, pole 2 lower contact of the reverse relay 112, lead 114, pole 4 of dictate-transcribe switch DT 2, drive motor DM, pole 1 upper contact of the scan switch 73a, pole 1 lower contact of the reverse relay 112 and lead 131 to a negative terminal of battery 106. The direction of current flow through the drive motor DM is now upward to cause the motor to run in a reverse direction. This does not however cause the belt record R and feed screw 27 to be turned in a reverse direction because the clutch C1 is now disengaged and the drive motor DM drives from the pulley 13 through the shaft 46, clutch C3, gear 64–63, spring clutch C4 and spring clutch C2 to shaft 17 for the belt mandrel 24, and drives the feed screw from the shaft 17 via the gears 28–30 and the differential gear mechanism 33 in the manner hereinbefore described. The belt record and head carriage are therefore now driven fast forward in-track because of the operator still holding the record switch 105 closed but this fast forward in-track movement continues only for a moment until the head has passed its prior in-track position of farthest advance as herein next described.

When the head carriage has reached its prior position of farthest advance across the belt record the advance clutch switch 104a is closed to activate momentarily the record coil 111R of the RR relay from the plus terminal of battery 106, through leads 107 and 134, playback end switch PE, pole 2 of the load switch 110, pole 1 upper contact of the dictate-transcribe switch DT1, coil 111R, pole 4 of the RR relay, advance clutch switch 104a, leads 146 and 115, pole 3 of the load switch 110, diode 116, playback switch 117, lead 118, edit switch 119 and lead 120 to the negative terminal of the battery 106. The RR relay 111 is therefore shifted to record position and is again latched. The resultant return of pole 1 of the RR relay to its upper contact breaks the circuit just described for the reverse relay 112. The drop out of the reverse relay 112 completes a circuit for the forward drive of the drive motor DM so long as the record switch 105 is held depressed. The circuit for the drive motor DM now runs through the record switch 105, pole 1 upper contact of the RR relay, pole 1 upper contact of the reverse relay 112, pole 1 upper contact of the scan switch 73a, drive motor DM in a downward direction for forward advance, pole 4 of the dictate-transcribe switch DT2, lead 114, pole 2 upper contact of the reverse relay 112, playback switch 117 and edit switch 119 to the negative terminal of the battery 106. Since the drive motor DM is now running in a forward direction the clutch C1 is engaged and the clutch C2 is engaged, the latter being held engaged by the pressure roller 61 because the backspace solenoid 58 is not now operated. The circuit to the buzzer 121 is now also broken by return of the RR relay to record position to inform the operator that he has passed the prior point of farthest advance. The operator will therefore begin speaking into the microphone to resume dictation or else release the record switch 105 to stop the machine until he has collected his thoughts.

It has been described that a dictator may backscan at any time simply by pressing the playback switch 117, that when he releases the playback switch the machine goes immediately into normal playback, and that if he presses the record button while the machine is in playback the head carriage is moved fast forward in cross-track relation to the belt record. Furthermore, it has been described that during such forward scan the operator may listen to another selected portion of his dictation by simply releasing the record switch 105, listening to the selected portion as the machine resumes playback and then again pressing the record switch to shift into forward scan until the last track convolution is reached preceding the prior point of farthest advance.

EDIT

A further facility available to the operator while the head carriage is in a backspaced position is to edit—i.e., re-record—the last portion of his recorded dictation from any selected point. For example, upon having pressed the playback switch to backscan and then having released the playback switch to shift the machine into normal playback, the operator may listen to a point from which he wants to re-record the entire remaining portion of his recorded dictation. This he may do by pressing the edit switch 119, releasing the same and then pressing the record switch 105 to resume normal recordation of dictation. Upon pressing the edit switch he activates an edit solenoid 148 from plus terminal of battery 106 through leads 107 and 147, start load switch SL, lead 149, edit solenoid 148, edit switch 119 lower contact and lead 120 to negative terminal of battery 106. Activation of the edit solenoid operates the trip number 91 to disengage the marker clutch MC and cause the measuring arm 102 to be driven back by the torsion spring 96 to its starting point where it opens the early advance clutch switch 104b and closes the advance clutch switch 104a. Since the scan switch 73a is already returned during playback, the opening of the early advance clutch switch 104b is without any effect. The closing of the advance clutch switch 104a however momentarily activates the record coil 111R of the RR relay through pole 4 of this relay to return the relay to record position. This shifts the machine into record condition and closes pole 1 of the relay with its upper contact to prepare the circuit for the drive motor DM. As the operator next presses the record switch 105 the edit switch 119 is returned to "run" position by a mechanical coupling 122 indicated by dash-dot lines and the drive is started in normal forward in-track movement. During such normal forward drive from a backspaced position the record head will erase from the magnetic belt the prior recording and will record anew the dictation spoken into the microphone. Thus, after the operator has pressed the edit button he may proceed in normal manner to record dictation from the point of the head 46 on the record at the instant the edit switch 119 was pressed.

TRANSCRIBE

The machine may be connected for secretarial use by shifting the first dictate-transcribe switch DT1 downwardly to transcribe position and shifting the second dictate-transcribe switch DT2 leftwardly to its transcribe position. The shifting of the switch DT2 connects a transcriber's control device 150 into circuit. Upon shifting the switch DT1 to transcribe position pole 1 thereof breaks with its upper contact to break the circuit of the record coil 111R of the RR relay 111, and makes with its lower contact to complete the circuit of the reproduce coil 111P of the RR relay to shift the relay to reproduce position, the circuit running from plus terminal of battery 106 via leads 107 and 134, playback end switch PE, pole 2 of load switch 110, pole 1 lower contact of switch DT1, pole 3 of RR relay, reproduce coil 111P and leads 125 and 120 to negative terminal of battery 106. Also, as the switch DT1 is shifted to transcribe position, the pole 2 thereof breaks with its upper contact to remove a circuit for the reverse relay 112 via the advance clutch switch 104b and it makes with its lower contact to place a shunt across the early advance clutch switch 104b.

Shifting of the RR relay 111 to playback position and of the switch DT2 to transcribe position completes a circuit for the drive motor DM from plus terminal of battery 106 via leads 107 and 134, playback end switch PE, pole 2 of load switch 110, pole 2 lower contact of RR relay, pole 1 upper contact of reverse relay 112, pole 1 upper contact of scan switch 73a, lead 151, pole 3 of switch DT2, governor shunt switch 152 of the transcriber's control device 150, pole 5 of switch DT2, lead 153, drive motor DM in a downward direction for forward advance, lead 154, pole 4 of switch DT2, secretarial run-stop switch 155 upper contact, speed control rheostat 156, pole 2 of switch DT2, lead 114, pole 2 upper contact of reverse relay 112, playback switch 117 upper contact, edit switch 119 upper contact, and lead 120 to negative terminal of battery 106. Whenever the secretary presses the run-stop switch 155 to stop position the circuit to the drive motor is broken and a short is placed across the drive motor to bring it to an immediate stop. The secretary may vary the motor speed by the rheostat 156, and if she moves the rheostat completely off the switch 152 is opened by a tie line conection 157 to remove the shunt from the motor governor and bring the drive motor to a controlled speed.

When the secretary presses the backspace switch 158 the backspace solenoid 58 is operated from plus terminal of battery 106 via leads 107 and 147, start load switch SL, lead 149, secretarial backspace switch 158, lead 159, backspace solenoid 58, lead 160, pole 5 of load switch 110 and leads 142 and 120 to negative terminal of battery 106. The operation of the backspace solenoid shifts the switch 58a to its lower contact to connect the coil of the reverse relay 112 to the lead 159 and cause the reverse relay to be operated via the secretarial backspace switch 158. Operation of the reverse relay supplies reverse current to the drive motor DM from plus terminal of battery 106 via lead 145, pole 2 lower contact of reverse relay 112, lead 114, pole 2 of DT2, rheostat 156, secretarial run-stop switch 155, pole 4 of DT2, lead 154, drive motor DM, pole 1 upper contact of scan switch 73a, pole 1 lower contact of reverse relay 112 and lead 131 to negative side of battery 106. The drive motor DM therefore runs in reverse to drive the mandrel 24 at fast speed via the clutches C3 and C5 and concurrently to drive the feed screw so that the head is back-spaced in-track at a fast speed, so long as the secretarial backspace switch is held depressed.

When the secretary presses the fast forward scan switch 160 the scan solenoid 73 is operated from plus terminal of battery 106 via lead 107, secretarial fast forward scan switch 160, lead 161, pole 4 upper contact of load switch 110, leads 126 and 127, scan solenoid 73 and negative terminal of battery 106. Operation of the scan solenoid disengages the pawls 66 and operates the scan switch 73a to start the scan motor SM running forward from plus terminal of battery 106 via lead 107, switch 160, pole 4 upper contact of load switch 110, lead 126, diode 124, pole 1 lower contact of switch DT1, pole 2 lower contact of RR relay, pole 1 upper contact of reverse relay 112, pole 1 lower contact of scan switch 73a, scan motor SM in a downward direction for forward advance, leads 130 and 129, pole 2 upper contact of reverse relay 112, lead 115, pole 3 of load switch 110, diode 116, playback switch 117, lead 118, edit switch 119 and lead 120 to negative terminal of battery 106.

CARRIAGE END-SWITCH CONTROLS

As before described, the backscan circuit to operate the scan solenoid 73 and in turn the reverse relay 112 and scan motor SM responsive to the operator pressing the playback switch 117 is from plus terminal of the battery 106 through the playback switch 117 and the upper contact of the start-backscan switch SB because the diode 116 paralleling this switch is poled against passing current from the plus terminal of the battery. Thus, when in the backscan movement of the carriage 44 the same comes against the backscan switch SB, this switch is thrown to its lower contact and the backscan movement is stopped. The backscan limit position defined by the switch SB for the carriage 44 is the farthest in a backspacing direction that the carriage can be moved.

A second backscan circuit for the carriage is initiated when the load lever L is operated preparatory to removing a belt record R from the machine. This operation of the load lever throws the load switches 110 to their lower contacts to provide, among other things, a circuit for the scan solenoid 73 from plus terminal of battery 106 via start load switch SL, pole 4 lower contact of the load switch 110, the scan solenoid 73 and negative terminal of the battery 106. Operation of the scan solenoid operates the scan switch 73a which in turn operates the reverse relay 112 by a circuit from the plus terminal of battery 106 via pole 6 lower contact of load switch 110, pole 2 lower contact of scan switch 73a, upper contact of backspace solenoid switch 58a, coil of reverse relay 112 and negative terminal of battery 106. Operation of the reverse relay in turn completes a circuit for the scan motor SM from plus terminal of battery 106 via pole 2 lower contact of reverse relay 112, scan motor SM, pole 1 lower contact of scan switch 73a, pole 1 lower contact of reverse relay 112 and negative terminal of battery 106. The backscan movement continues responsive to throwing the load switch 110 until the start load switch SL is operated by the carriage 44. When the carriage operates the start load switch the circuit for the scan solenoid is broken and as the scan solenoid is dropped it in turn drops the reverse relay and stops the scan motor SM. The start load switch SL is positioned about one or two track pitch distances ahead of the start backscan switch SB. This relative positioning of the start load switch to the start backscan switch is provided so that when the backscan is produced preparatory to changing a belt record the resumption of the recordation of dictation will be at a suitable distance in advance of the playback backscan limit position to enable the operator to listen back at least to the very beginning of his recorded dictation.

The record end switch RE is in the record circuit through the record start switch 105 to provide a limit on the farthest possible advance of the carriage 44 during recording. As before described, the drive motor DM is activated in a forward direction during playback from plus terminal of battery 106 through playback end switch PE, pole 2 of load switch 110 and pole 2 lower contact of RR relay 111. When the carriage in its forward advance movement operates the playback end switch PE the drive system is stopped. Again so that the operator can play back at least to the very end of his recorded dictation the playback end switch PE is positioned beyond the record end switch RE.

SIGNALLING

Upon the operator attempting to record dictation by pressing the record switch 105 when either 1) the carriage 44 is at its end of travel for recordation of dictation causing the record end safety switch RE to be thrown to its lower contact, or 2) no belt record is mounted in the machine causing the belt record safety switch 109 to be thrown to its lower contact, or 3) the load lever L is not operated to tension the belt record between the mandrels 24 and 25 causing pole 1 of load safety switch 110 to be made with its lower contact, the circuit to the drive motor DM is not only broken but further a warning circuit is completed from plus terminal of battery 106 through the record switch 105, the safety switch just mentioned, jumper 135, lead 108, buzzer 121 and leads 142 and 120 to negative terminal of battery 106.

Another condition when the warning buzzer 121 is operated is when an operator presses the playback switch to listen back to his recorded dictation and holds the playback switch operated until the carriage is backspaced to its limit, causing then the start backscan switch SB to be operated to complete a warning circuit from plus terminal of battery 106 through lower contact of playback switch 117, start backscan switch SB at its lower contact, diode 139, buzzer 121 and negative terminal of battery 106.

Still another condition in which the warning buzzer is operated is when after listening back to a portion of one's recorded dictation the operator presses the record button to forward scan the head carriage to its prior position of farthest advance for in so doing a warning circuit is completed from plus terminal of battery 106 through record switch 105, pole 1 lower contact of RR relay, leads 136 and 140, diode 141, buzzer 121 and leads 142 and 120 to negative terminal of battery 106. When the prior position of farthest advance is reached the RR relay is shifted back automatically to record position as before described, and in this shifting of the RR relay the circuit to the warning buzzer is broken to stop the warning signal.

The embodiment of my invention herein particularly shown and described is intended to be illustrative and not necessarily limitative of my invention since the same is subject to changes and modifications without departure from the scope of my invention, which I endeavor to set forth by the following claims.

What is claimed is:

1. In a phonographic machine including a record supporting device and a record cooperable translating device, one of said devices being mounted for advance and backspace movements relative to the other: a mechanism for measuring the backspacing displacement of said one device from any selective position in its path of travel comprising a first measuring element, a fixed shaft having a screw-threaded portion, a second cooperating measuring element threaded on said shaft for movement in a helical path and having a pitch sufficient to clear said first element in the first revolution thereof from a home position, a tubular member rotatably mounted on said shaft, an arm connected to said tubular member and extending therefrom in slidable coupled relation to said second measuring element to cause the latter to be turned on said threaded portion in unison with the rotary movement of the tubular member, a torsion spring in an end portion of said tubular member between the tubular member and said shaft for biasing said second measuring element into said home position, and a coupling between said one device and said tubular member comprising a cylindrical clutch body in another end portion of said tubular member rotatably mounted on said shaft and coupled to said one device to turn about said shaft in proportion to the advance and backspace movements of said one device, said clutch body having a peripheral flat providing space between it and said tubular member and a clutch roller in said space biased in one direction to urge said clutch roller between said tubular member and said clutch body to provide a one-way clutch action between said clutch body and tubular member effective during movements of said one device from and to a position to farthest advance to move said second measuring member proportionately from and to home position against the resisting force of said torsion spring.

2. The combination set forth in claim 1 including a clutch trip member movable rotatably and slidably on said shaft, said trip member including a trip arm extending into said space in said tubular member along said roller at the front side of the roller relative to the direction in which the roller is biased, cam means between said trip member and said cylindrical clutch body for turning the trip member on said shaft to cause said trip arm to move said clutch roller into a disengaged position as said trip member is shifted along said shaft, and means for shifting said trip member.

3. The combination set forth in claim 1 including a disk on said shaft in fixed coupled relation to said clutch body to turn in unison therewith, and means engaging opposite sides of said disk to place a friction drag on the movement of said clutch body.

4. In a phonographic machine including a rotatable record support and a record cooperable translating device, and means mounting said translating device for traveling movement relative to the record support: the combination of a drive system for rotating said record support and for concurrently progressively advancing said translating device to cause said translating device to describe a helical track of uniform pitch on a supported record, a scan mechanism operable selectively to backspace and advance said translating device across track while said record support is at standstill, control means for said scan mechanism comprising a playback control for activating said scan mechanism in a backward direction, a forward scan control and means timed with said scan mechanism for maintaining operation thereof after return of either of said controls to a stop position until completion of movement of the translating device through the track pitch interval then underway whereby each scan movement is limited to an integral number of track pitch distances, an advance marker means for said translating device including a first marker switch operated by the translating device when the same is at least one full track pitch distance from its prior position of farthest advance, and means rendered operative by said first marker switch during a forward scan operation for stopping said scan mechanism when said translating device reaches its next in-track position and for thereupon starting said drive system.

5. The combination set forth in claim 4, wherein said drive mechanism is operable at normal and above-normal speeds, including means for starting said drive mechanism at above-normal speed by said first marker switch when said translating device reaches said next in-track position.

6. The combination set forth in claim 5 wherein said advance marker switch means includes a second marker switch moved to unoperated position in the immediate backspace movement of said one device from a position of farthest advance, and means controlled by said second marker switch for conditioning said forward scan control to serve as a start-stop record control for said drive system and for conditioning said drive system to operate at normal speed when said translating device has moved past its prior position of farthest advance.

7. The combination set forth in claim 6 including means responsive to pressing said playback control for shifting said phonographic machine from record to reproduce condition and means controlled by said second marker switch for returning said shifting means to condition said machine for recording concurrently as said drive system is returned to operate at normal speed.

8. In a phonographic machine including a rotatable record supporting device and a record cooperable translating device, means mounting one of said devices for traveling movement relative to the other: the combination of a drive mechanism for rotating said record supporting device and for concurrently progressively advancing said one device to cause said translating device to describe a helical track of uniform pitch on a supported record, means for conditioning said drive mechanism to operate at normal and above-normal speeds, a scan mechanism operable selectively to backspace and advance said one device crosstrack while said drive mechanism is at standstill, said scan mechanism including means to limit each operation thereof to moving said one device through an integral number of track pitch distances, a record control member operable while said one device is in a backspaced position to activate said scan mechanism in a forward direction, and means operable in proportion to the distance of backspacing of said one device from a position of farthest advance while said record control member is held operated for stopping said scan mechanism and starting said drive mechanism at above normal speed when said one device reaches an in-track position a predetermined distance from its prior position of farthest advance and for shifting said drive mechanism from above-normal to normal speed when said one device is returned to its prior position of farthest advance.

9. A scanning mechanism for the traveling carriage of a phonographic machine comprising a scan motor, a rotatable drive member driven by said motor and coupled to said carriage to move the latter through the pitch distance between successive track convolutions on the record for each full revolution of the drive member, means for latching said drive member in one position only against movement in both forward and backward directions comprising a disk portion on said drive member having a single peripheral notch with leading and trailing end walls, a pair of pivoted latch pawls individually biased against said disk portion to engage said notch, said pawls having respective teeth of lesser dimensions in the plane of said disk portion than the peripheral length of said notch, the tooth of one of said pawls having a leading catch surface for engaging the trailing end wall of said notch to latch said drive member against advance rotation, and the tooth of the other of said pawls having a trailing catch surface for engaging the leading end wall of said notch when said drive member is stopped by said one pawl to latch said drive member against backward rotation, and means responsive only to a latching engagement of both of said pawls with said notch for stopping said scan motor.

10. The scanning mechanism set forth in claim 9 wherein said notch has substantially parallel leading and trailing end walls, and wherein the tooth of said one pawl has an oblique trailing surface to allow a progressive engagement of said one pawl with said notch when the drive member is rotated in an advance direction, and the tooth of said other pawl has an oblique leading edge effective when the drive member is reversely rotated to allow a progressive engagement of said other pawl with said notch.

11. In a phonographic machine including a rotatable record supporting device and a record cooperable translating device, means mounting one of said devices for traveling movement relative to the other, and a drive system for rotating said record supporting device and for concurrently progressively advancing said one device to cause said translating device to describe a helical track on a supported record: the combination of a scan mechanism selectively operable for shifting said one device in forward and backward directions while said record supporting device is rotatably stationary, a playback control member movable to an operated position to activate said scan mechanism in a backward direction, a signalling device, and means responsive upon said playback control member being held in operated position and said one device reaching the limit in its backspacing movement for activating said signalling device.

12. A phonographic machine comprising in combination a pair of spaced parallel mandrels for carrying a belt record for revolving movement, a record cooperable translating device, means mounting said translating device for traveling movement relative to said mandrels, a drive system for rotating said mandrels and for concurrently progressively advancing said translating device to cause the translating device to describe a helical track on a supported record, a scan mechanism selectively operable for shifting said translating device in forward and backward directions while said mandrels are rotatively stationary, means mounting one of said mandrels in fixed bearings and mounting the other mandrel for movement towards and away from said one mandrel, spring means acting on said movable mandrel to tension said belt record, means for shifting said other mandrel towards said one mandrel to permit said belt record to be slid off of said mandrels, and means responsive to said shifting means for activating said scan mechanism to move said translating device backward to its starting position.

References Cited by the Examiner
UNITED STATES PATENTS

| | | | |
|---|---|---|---|
| 2,286,346 | 6/1942 | Clausen | 274—9 |
| 2,286,347 | 6/1942 | Clausen | 274—9 |
| 2,318,828 | 5/1943 | Yerkovich | 274—11 |
| 2,664,293 | 12/1953 | Yerkovich | 274—22 |
| 2,691,529 | 10/1954 | Skoog | 274—1 X |
| 2,740,307 | 4/1956 | Wakefield | 74—674 |
| 2,756,057 | 7/1956 | Parkinson | 274—22 |
| 2,776,142 | 1/1957 | Buhrendorf | 274—13 |

(Other references on following page)

UNITED STATES PATENTS

| | | | |
|---|---|---|---|
| 2,855,205 | 10/1958 | Dinsmore | 274—14 X |
| 2,902,886 | 9/1959 | Nacken | 74—665 |
| 2,917,930 | 12/1959 | Sherwood | 74—25 |
| 2,926,920 | 3/1960 | Lorenz. | |
| 2,930,243 | 3/1960 | Proctor | 74—27 |
| 2,951,127 | 8/1960 | Pierson | 179—100.2 |
| 3,021,143 | 2/1962 | Whitney | 274—4 |
| 3,051,492 | 8/1962 | Crocker | 274—14 |
| 3,056,606 | 10/1962 | Schueler | 274—17 |
| 3,091,668 | 5/1963 | Frost | 179—100.2 |
| 3,122,943 | 3/1964 | Coombs | 74—661 |

NORTON ANSHER, *Primary Examiner.*